(12) United States Patent
Park

(10) Patent No.: US 6,275,272 B1
(45) Date of Patent: Aug. 14, 2001

(54) PROJECTION TELEVISION RECEIVER

(75) Inventor: Jong-bae Park, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/141,555

(22) Filed: Aug. 28, 1998

(30) Foreign Application Priority Data

Aug. 30, 1997 (KR) .................................................. 97-44517

(51) Int. Cl.⁷ ...................................................... H04N 5/74
(52) U.S. Cl. ...................... 348/744; 348/759; 348/779; 348/781; 348/782
(58) Field of Search .................... 348/744, 759, 348/760, 776, 778, 779, 780, 781, 782; H04N 5/74

(56) References Cited

U.S. PATENT DOCUMENTS

| | | | | |
|---|---|---|---|---|
| 2,389,645 | * | 11/1945 | Sleeper | 178/5.2 |
| 2,389,646 | * | 11/1945 | Sleeper | 178/5.2 |
| 2,623,190 | * | 12/1952 | Roth | 313/77 |
| 3,006,989 | * | 10/1961 | Schroter | 178/5.4 |
| 4,032,968 | * | 6/1977 | Miyoshi et al. | 358/60 |
| 4,697,892 | * | 10/1987 | Betensky | 350/432 |
| 4,948,237 | * | 8/1990 | Hirata et al. | 350/432 |
| 5,103,302 | * | 4/1992 | Yoshida et al. | 358/60 |
| 5,532,763 | * | 7/1996 | Janssen et al. | 348/744 |
| 5,592,238 | * | 1/1997 | Ogino et al. | 348/744 |
| 5,635,997 | * | 6/1997 | Lewis | 348/742 |
| 5,739,875 | * | 4/1998 | Toide et al. | 348/744 |
| 5,781,251 | * | 7/1998 | Otto | 348/744 |
| 6,034,824 | * | 3/2000 | Moon | 359/651 |
| 6,049,364 | * | 4/2000 | Takahara et al. | 349/10 |

FOREIGN PATENT DOCUMENTS

WO/KR940880I* 8/1996 (KR) .

* cited by examiner

Primary Examiner—Reinhard J. Eisenzopf
Assistant Examiner—Brian P. Yenke
(74) Attorney, Agent, or Firm—Sughrue, Mion, Zinn, Macpeak & Seas, PLLC

(57) ABSTRACT

A projection television receiver for embodying a high definition and high quality projection television receiver by processing an image of an image source. A red, a green and a blue image are formed and emitted into a red, a green and a blue colors at a cathode ray tube. The emitted red, green and blue images are received and gathered for reiterating the red, the green and the blue images at a mirror unit. The reiterated red, green and blue images unit are displayed onto a screen by enlarging and projecting the images through a lens assembly.

11 Claims, 3 Drawing Sheets

PROJECTION TELEVISION RECEIVER

BACKGROUND OF THE INVENTION

1. Field of the Invention.

The present invention relates to a projection cathode ray tube for enlarging and projecting a small image which is formed on the cathode ray tube by using a projection lens and a single cathode ray tube as an image source, and more particularly, related to a projection television receiver for forming each red, green and blue image on one cathode ray tube, projecting the formed images using one lens and embodying a screen larger than that of a 40 inch television set as an image display device for a projection television receiver having high definition.

2. Background of the Related Art

Recently, in projection television receivers embodying a large sized screen, the image forming ability of the lens for enlarging and projecting an image which is formed on each red, green and blue fluorescent surface of the cathode ray tube, has been developed and the requirements for a projection lens as an essential element are important.

In such an environment, the lenses have improved image forming capabilities and ability.

In lens design, the differentiation of the lens related to a configuration method, number and shape of the lens even though in the same lens design concept is attempted through different lens design and development. For example, U.S. Pat. Nos. 4,948,237 and 4,697,892 are examples of such differentiation of the lens.

The general projection lens which is listed in the above-mentioned technology has a good image forming ability in the respective wavelength field by executing aberration correction at a predetermined wavelength.

In example, the predetermined wavelength is an e-line (546.1 mm) which is next to a central wavelength of the green cathode ray tube.

However, the chromatic aberration is caused because the lens which is designed for using in the e-line is used at the red and the blue cathode ray tubes in the same condition as when the light is deviated from the e-line and the spectral spectrum of the green cathode ray tube does not have a homogeneous property and emits light of the red color and the blue color zones.

Thus, in the optical system of where chromatic aberration is not corrected, in other words, where aberration is not corrected simultaneously in the zones of the red, the green and the blue color wavelengths, the system, and is not suitable for a display lens for a high definition and a high image because the optical system causes deterioration of definition and image in the television receiver set.

The conventional, three cathode ray tubes such as a red, a green and a blue cathode ray tubes and displaying device which displays images onto the screen by enlarging and projecting each image from the cathode ray tubes will be described in FIG. 1.

The device shown in FIG. 1 will be described as an example of a conventional projection cathode ray tube. 5 The above-mentioned cathode ray tube consists of a first through a third cathode ray tubes 101 through 103 for respectively emitting a red, a green and a blue colored image which are formed on a fluorescent surface and a first through a third lens assemblies 104 through 106 for a red, a green and a blue image formed on the side of the first through the third cathode ray tubes 101 through 103, enlarges and projects the red, the green and the blue images for displaying the images onto a screen 100.

A conventional cathode ray tube which is formed as an aforementioned manner will be described in detail with reference to FIG. 1.

First, each forming image of the red, the green and the blue color is emitted from the fluorescent surface of the first through the third cathode ray tubes 101 through 103 having a red, a green and a blue colors for embodying colors and received at the first through the third lens assemblies 104 through 106.

The first through the third lens assemblies 104 through 106 enlarge and project the received red, green and blue images for forming images and displays the images onto the screen 100.

In other words, when each red, green and blue colored image which is respectively formed on the fluorescent surface of the first, the second and the third cathode ray tubes 101 through 103, is emitted and received to the first through the third lens assemblies 104 through 106 for projecting the images, the first lens assembly 104 enlarges and projects the red colored image for forming an image from the first cathode ray tube 101, the second lens assembly 105 enlarges and projects the green colored image for forming an image from the second cathode ray tube 102 and the third lens assembly 106 enlarges and projects the blue colored image for forming an image from the third cathode ray tube 103 and each image is displayed onto the screen 100, accordingly, the red, the green and the blue images for forming an images corresponding to the image source are enlarged and displayed onto the screen 100.

But, as mentioned above, the conventional projection cathode ray tube requires three cathode ray tubes for emitting the red, the green and the blue images for forming images and three lens assemblies for enlarging and projecting the red, the green and the blue images for forming images emitted from the cathode ray tubes and displaying the images onto the screen.

Accordingly, the projection television receiver for embodying a large sized screen by enlarging and projecting formed images on each red, green and blue fluorescent surface of the cathode ray tube essentially requires three lens assemblies in the conventional projection television receiver.

By using three cathode ray tubes and three lens assemblies corresponding to each red, green and blue color for embodying a large sized screen, the productivity is decreased, the operation for adjusting exact focus correction of the three lenses onto the screen is difficult and the size of the projection television receiver is larger. Accordingly, it is unsuitable for using in high definition and high quality video cassette projector optics.

Moreover, when each red, green and blue cathode ray tube and each lens assembly is respectively integrated as one cathode ray tube and one lens assembly, it is difficult to form a structure for, and also effectively gathering the formed images for red, green and blue colors and precisely enlarging and projecting them onto the screen.

Accordingly, it is preferable to develop the projection television receiver having a larger screen compared to a conventional screen size and high resolution without complexity of structure and larger set size due to the structure of the projection cathode ray tube.

SUMMARY OF THE INVENTION

It is therefore an object of the present accurately to provide a projection television receiver for embodying high image and high definition by using one cathode ray tube.

It is another object of the present invention exactly to enlarge and project a red, a green and a blue images onto a screen by using one cathode ray tube and one lens assembly corresponding to the cathode ray tube.

It is still another object of the present invention to minimize the size of the projection television receiver which provides a high definition and high image.

In the present invention, the red, the green and the blue images are formed, emitted and divided into the red, the green and the blue color at the cathode ray tube. The emitted red, green and blue images are received and gathered for reiterating the red, the green and the blue images at a mirror unit. And the reiterated red, green and blue images by the mirror unit are displayed onto the screen by enlarging and projecting them through a lens assembly.

Preferably, a sectional shape of a panel of the cathode ray tube is formed as a biconvex toward both side portions corresponding to each red, green and blue image and fluorescent material which corresponds to the red, the green and the blue colors is spread on the convex portion of an inner surface of the panel. Accordingly, the red, the green and the blue images are easily transported to the mirror unit.

Moreover, the convex portion of the panel is formed as a Fresnel lens in one preferable embodiment.

Moreover, the mirror unit includes first and second reflecting mirrors which respectively reflect the images which are located in both side portions such as a red and a blue images among the projected red, green and blue images which are emitted from the cathode ray tube, and a dichroic mirror which receives each reflected images from the first and the second reflecting mirrors and the image which is located in the center of the red, the green and the blue imaged such as a green image, reiterates them and transports them to the lens assembly.

According to another aspect of the present invention, the red, the green and the blue images are divided into each red, green and blue color, formed and emitted by the cathode ray tube. The red, the green and blue images emitted from the cathode ray tube are suitably refracted the projected by the lens unit. The projected red, green and blue images are received and gathered for reiterating the red, the green and the blue images by the mirror unit. The reiterated red, green and blue images by the mirror unit are enlarged, projected and displayed onto the screen by the lens assembly.

Selectively, a supplementary lens unit which is formed corresponding to the red, the green to the blue images and supplementarily refract the red, the green and the blue images can be further included at the panel of the cathode ray tube.

Preferably, the supplementary lens unit is formed on an inner portion of the panel, spreads the fluorescent material for corresponding to the red, the green and the blue images and includes a first through a third image forming members for respectively forming the red, the green and the blue images and a first through a third emitting members which are formed for respectively corresponding to the first through the third image forming members at the outer surface of the panel and emitting the formed red, green and blue images. More preferably, the image forming member and the emitting member are formed as a single body with the panel.

Also, the lens unit includes a first through a third lenses which are respectively corresponding to the red, the green and the blue images and the first through the third lenses are formed as biconvex lenses or Fresnel lenses.

DETAILED DESCRIPTION OF THE PREFERRED EMBODIMENTS

There are a plurality of embodiments in the present invention. The most, and also preferable embodiment will be described in detail.

Moreover, the purposes, characteristics and advantages of the present invention will be understood through the preferable embodiment.

The preferable embodiment of a projection television receiver will be easily understood with reference to the drawings.

Figure 1:
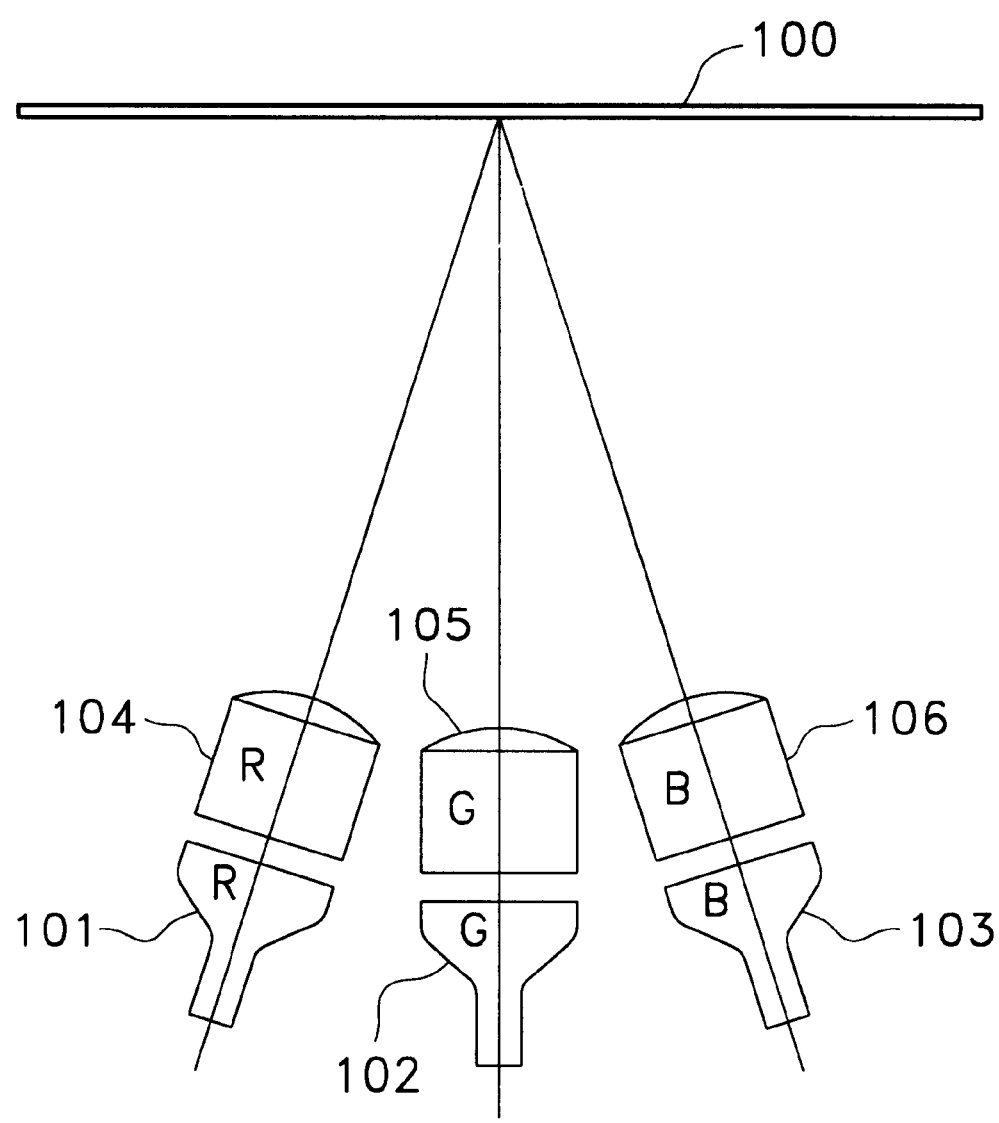
FIG. 1 is a schematic diagram of a conventional projection cathode ray tube.
Figure 2:
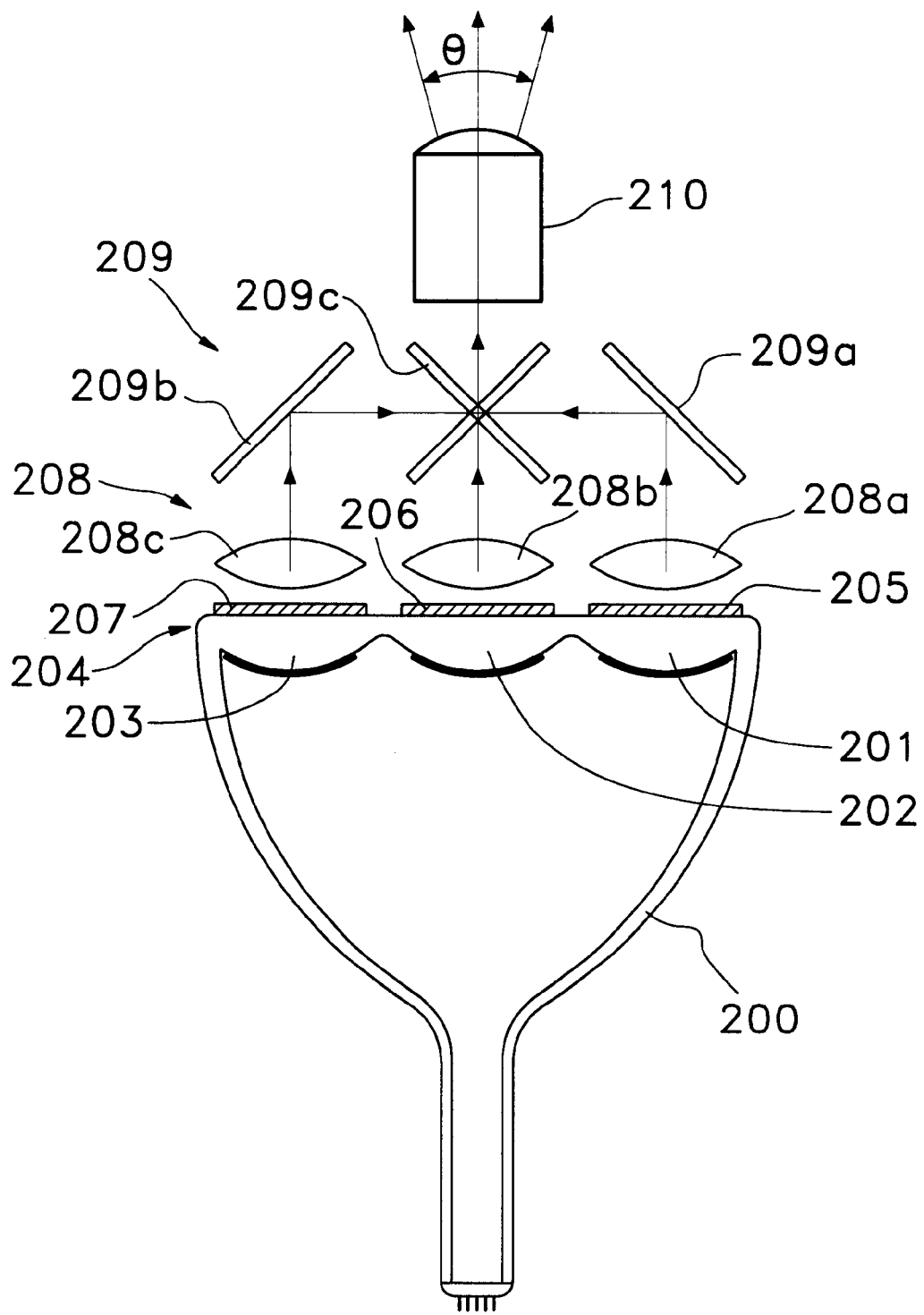
FIG. 2 is a schematic diagram illustrating an embodiment for explaining a projection television receiver according to the present invention.

Referring to FIG. 2, the projection television receiver according to the present invention includes a cathode ray tube 200 which forms an image having each red, green and blue color as an image source and emits them; a mirror unit 209 which reiterates each received red, green and blue image from the cathode ray tube 200 and gathers the image to the screen direction and a lens assembly 210 which enlarges and projects each received red, green and blue image from the mirror unit 209 and displays the images onto a screen.

Selectively, a lens unit 208 having a small refractive index is equipped with a first through a third lenses 208a through 208c corresponding to each red, green and blue image and projects the emitted red, green and blue images form the cathode ray tube can be installed on an outer side portion of the panel of the cathode ray tube 200.

A first through a third image forming members 201 through 203 which respectively form the red, the green and the blue images emitted form an electron gun at an inside portion of the panel of the cathode ray tube 200 by spreading flourescent material corresponding to the red, the green and the blue colors. A first through a third emitting members 205 through 207 for emitting the formed red, green and blue images which images are respectively corresponding to the first through the third image forming members 201 through 203 to a first through a third lenses 208a through 208c of the lens unit 208 are formed at an outer surface of the panel of the cathode ray tube 200. Preferably, the first through the third image forming members 201 through 203 and the first through the third projecting members 205 and 207 can change the sectional shape of the panel of the cathode ray tube 200 by respectively forming pairs, for example, working as convex lenses.

The mirror unit 209 includes a first and a second reflecting mirrors 209a and 209b which receive the red and the blue images among the red, the green and the blue images projected from the first through the third lenses 208a through 208c of the lens unit 208 and respectively reflect the images 90 degrees and a dichroic mirror 209c which reiterates the red and the blue images received from the first and the second reflective mirrors 209a and 209b and the green image received by projecting the images from the second lens 208b of the lens unit 208 and gathers the images to the lens assembly 210.

The projection television receiver of the present invention having such a (each instance) structure embodies a (each instance) desirable sized image by enlarging and projecting images which have each red, green and blue color for embodying colors through a first and a second preferable embodiments.

Figure 3:
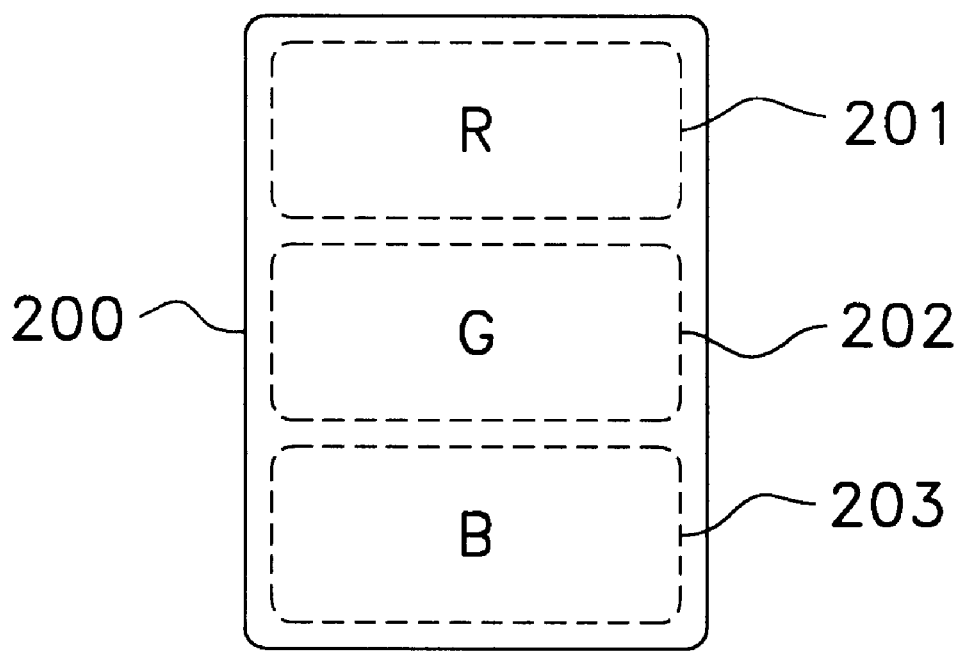
FIG. 3 is a front view illustrating an image forming member which is comprised on the cathode ray tube of FIG. 2 in detail.

With referring to FIGS. 2 and 3, the present invention will be described more detail.

First, the images having each red, green and blue color for embodying colors are emitted from the electron gun of the cathode ray tube 200 and respectively formed images on the fluorescent material which is spread on the first through the third image forming members 201 through 203 in the first preferred embodiment.

The red, the green and the blue images which are formed on the first through the third image forming members 201 through 203 of the cathode ray tube 200 are emitted to the direction of the screen through the first through the third emitting members 205 through 207 which are formed on the outer surface of the cathode ray tube 200.

Each projected red, green and blue image is projected through the first through the third lenses 208a through 208c of the lens unit 208. Then, the red image which is emitted from the first emitting member 205 of the cathode ray tube 200 is projected by the first lens 208a of the lens unit 208 and transported to the first reflecting mirror 209a of the mirror unit 209. The blue image which is emitted from the third emitting member 207 of the cathode ray tube 200 is projected by the third lens 208c of the lens unit 208 and transported to the second reflecting mirror 209b of the mirror unit 209.

Moreover, the green image which is emitted from the second emitting member 206 of the cathode ray tube 200 is projected by the second lens 208b of the lens unit 208 and transported to the dichroic mirror 209c of the mirror unit 209 which will be described hereinafter.

The first through the third lenses 208a through 208c of the lens unit 208 have a very small refractive index and a biconvex lens, a Fresnel lens or a complex lens can be used as a lens for the first through the third lenses 208a through 208c of the lens unit 208.

Accordingly, the first through the third lenses 208a through 208c of the lens unit 208 can effectively and exactly incident the red, the green and the blue images which are emitted by the cathode ray tube 200 to the mirror unit 209.

Consequently, each projected red, green and blue image from the first through the third lenses 208a through 208c of the lens unit 208 is reflected to 90 degrees by the mirror surface of the first and the second reflecting mirrors 209a and 209b and received to the cross-shaped dichroic mirror 209c.

The dichroic mirror 209c exactly reiterates the red and the blue images which are reflected from the first and the second mirrors 209a and 209b of the mirror unit 209 and the green image which is transported from the second lens 208b of the lens unit 208 and transports the red, the green and the blue images to the lens assembly 210.

The lens assembly 210 embodies a desirable sized screen by enlarging, projecting and displaying the reiterated and received red, green and blue images from the dichroic lens 209c.

In the second preferable embodiment, the sectional shape of the panel 204 of the cathode ray tube 200 is different because the lens unit 208, is omitted from the aforementioned first preferable embodiment. The first through the third screen image forming members 201 through 203 and the first through the third emitting members 205 through 207, for example, are paired to work as convex lenses. For example, the first through the third screen image forming members 201 through 203 and the first through the third emitting members 205 through 207 can be formed, from the sectional shape into the semicircular shape without deforming the sectional shape of the panel 204.

Like this, when the sectional shape of the panel 204 of the cathode ray tube 200 is a biconvex shape such as the first through the third lenses 208a through 208c of the lens unit 208 in the first preferable embodiment, the red, the green and the blue images emitted from the light source are formed and the formed images are transported to the mirror unit 209.

Then, the fluorescent material is spread on the inner surface of the panel 204 in the element among forming elements of the biconvex lens for forming the red, the green and the blue images without using a supplementary lens unit.

When it is difficult to exactly transport the red, the green and the blue images, which images are emitted from the cathode ray tube 200 according to the second preferable embodiment to the mirror unit 209, more than one lens unit 208 which is composed of the first through the third lenses 208a through 208c in the first preferable embodiment is supplemented accurately receiving the red, the green and the blue images to the mirror unit 209.

When the red, the green and the blue images are respectively emitted form the cathode ray tube 200 as discussed above, the dichroic mirror 209c of the mirror unit 209 gathers the emitted images, enlarges and projects the images onto the screen, accordingly and, a desirable size of the screen is obtained.

The red, the green and the blue images are respectively formed on the surface of the cathode ray tube 200 which is formed as a single body, enlarged and projected by using one lens assembly and embodied to a desirable sized screen in the present invention. But in the conventional projection television receiver, each red, green and blue cathode ray tube and lens assembly are needed for embodying a desirable sized screen.

In the above-mentioned result, according to the present invention, the high definition and high quality of a screen compared to a conventional projection television receiver is obtained with embodying a desirable sized screen. Moreover, the size of the projection television receiver is reduced by using one cathode ray tube and one lens assembly.

As aforementioned, by integrating each cathode ray tube and lens assembly for the red, the green and the blue images of a conventional projection television receiver into one cathode ray tube and one lens assembly, the size of the projection television receiver can be optimized and the size of the screen can be larger compared to the conventional projection television receiver.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A projection television receiver, comprising:
   a cathode ray tube which forms and emits a red, a green and a blue image separately according to each color;

a mirror unit which receives and gathers said emitted red, green and blue images for reflecting the red, green and blue images, wherein said mirror unit comprises a first mirror for receiving and reflecting a first one of said red, green and blue images emitted from said cathode ray tube, a second mirror for receiving and reflecting a second one of said red, green and blue images emitted from said cathode ray tube, and a third mirror for receiving and reflecting a third one of said red, green and blue images emitted from said cathode ray tube and said first and second ones of said red, green and blue images reflected from said first and second mirrors; and a lens assembly which enlarges and projects the reflected image from said mirror unit for displaying the images onto a screen, wherein a sectional shape of a panel of said cathode ray tube corresponding to said red, green and blue images is biconvex, respectively and fluorescent material corresponding to a red, a green and a blue colors is spread on a convex portion of an inner surface of said panel.

2. A projection television receiver, comprising:

a cathode ray tube which forms and emits a red, a green and a blue image separately according to each color;

a mirror unit which receives and gathers said emitted red, green and blue images for reflecting the red, green and blue images; and a lens assembly which enlarges and projects the reflected image from said mirror unit for displaying the images onto a screen, wherein a sectional shape of a panel of said cathode ray tube corresponding to said red, green and blue images is biconvex, respectively and fluorescent material corresponding to a red, a green and a blue colors is spread on a convex portion of an inner surface of said panel.

3. The projection television receiver according to claim 2, wherein the convex portion of said panel is formed as a Fresnel lens.

4. The projection television receiver according to claim 1, said third mirror comprises a dichroic mirror.

5. A projection television receiver comprising:

a cathode ray tube which forms and emits a red, a green and a blue image separately according to each color;

a supplementary lens unit which is respectively formed corresponding to said red, green and blue images on a panel of said cathode ray tube and supplementarily refracts said red, green and blue images;

at least one lens unit which suitably refracts and projects said red, green and blue images emitted from said cathode ray tube and refracted by said supplementary lens unit;

a mirror unit which receives and gathers said red, green and blue images emitted from said lens unit for reflecting said red, green and blue images; and a lens assembly which enlarges and projects said reflected images from said mirror unit for displaying the image onto a screen.

6. The projection television receiver according to claim 5, said supplementary lens unit comprising:

first, second and third image forming members which are formed on an inner surface of said panel, having fluorescent material corresponding to said red, green and blue colors being spread thereon and to respectively form said red, green and blue images; and first, second and third emitting members which are formed on an outer surface of said panel corresponding to said image forming members and for emitting said formed red, green and blue images.

7. The projection television receiver according to claim 6, wherein said image forming members and said emitting members are formed as a single body with said panel.

8. A projection television receiver, comprising:

a cathode ray tube which forms and emits a red, a green and a blue image separately according to each color;

at least one lens unit which suitably refracts and projects said red, green and blue images emitted from said cathode ray tube;

a mirror unit which receives and gathers said red, green and blue images emitted from said lens unit for reflecting said red, green and blue images; and a lens assembly which enlarges and projects said reflected images from said mirror unit for displaying the image onto a screen, wherein said lens unit includes first, second and third lenses which respectively correspond to said red, green and blue images.

9. The projection television receiver according to claim 8, said lenses including a biconvex lens.

10. The projection television receiver according to claim 8, said lenses including a Fresnel lens.

11. A projection lens assembly comprising:

a cathode ray tube which forms and emits a red, a green and a blue image separately according to each color;

at least one lens unit which suitably refracts and projects said red, green and blue images emitted from said cathode ray tube;

a mirror unit which receives and gathers said red, green and blue images emitted from said lens unit for reflecting said red, green and blue images; and a lens assembly which enlarges and projects said reflected images from said mirror unit for displaying the image onto a screen, wherein said mirror unit comprises:

a first and a second reflecting mirrors which respectively receive and reflect images located at both sides of said reflecting mirrors among said red, green and blue images emitted from said lens unit; and a dichroic mirror which receives reflected images from said first and said second reflecting mirrors and image located at a center portion of said red, green and blue images, and conveys the images to said lens assembly.

* * * * *